Nov. 23, 1926.
C. L. DEWEY
1,608,375
FISH LURE
Filed March 1, 1924
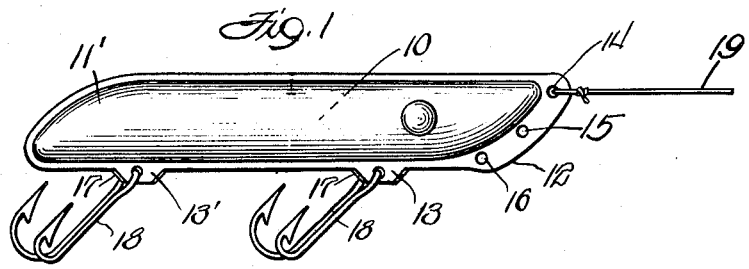
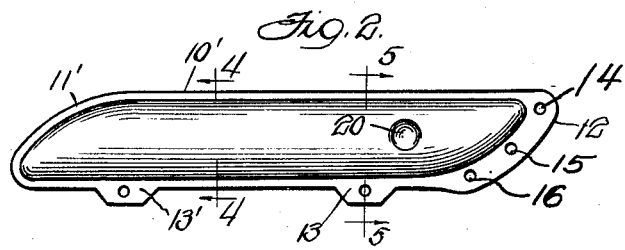
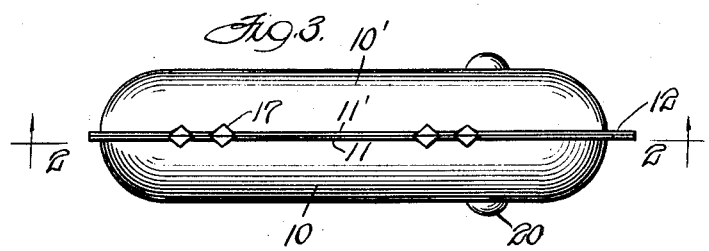
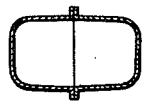 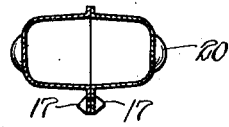
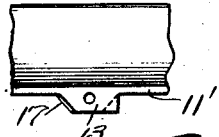
Inventor:
CLARENCE L. DEWEY Patented Nov. 23, 1926.

1,608,375

UNITED STATES PATENT OFFICE.

CLARENCE L. DEWEY, OF ELKHART, INDIANA.

FISH LURE.

Application filed March 1, 1924. Serial No. 696,193.

The invention relates to improvements in fish lures.

One of the objects of the invention is to make a casting or trolling lure or bait entirely of metal which is made buoyant by enclosing an air space in an imperforate casing.

Another object is to provide attaching means for hooks and a line without penetrating the interior of the device.

A further object is to provide means for causing the lure to become submerged to a varying selective extent, or to take a path upon the surface of the water.

Another object is to provide an all metal lure which will not sink when motionless on the surface of the water.

A further object is to simplify and cheapen the construction of the device by stamping and forming it in two pieces with the fastening means as inherent integral parts thereof, each piece contributing in the formation of the fastening means for the hooks and for the line.

Other objects and advantages will readily appear from the following description, when taken in conjunction with the accompanying drawing, forming a part hereof, wherein:—

Fig. 1 is a side elevation of one form of the device.

Fig. 2 is a side elevation of one-half of the device on line 2—2 of Fig. 3.

Fig. 3 is a plan view of the completed device.

Fig. 4 is a section on line 4—4 of Fig. 2.

Fig. 5 is a section on line 5—5 of Fig. 2.

Fig. 6 is a fragment of an unfinished part of the structure.

In all the views the same reference characters are employed to indicate similar parts.

The device is preferably made of aluminum, although other sheet metal or moldable material may be used. For example, the structure may be molded of more or less transparent or translucent plastic such as celluloid or a phenolic condensation product and its interior may be filled or coated with a light absorbing and radiating paint of the character of radium, or the like. This feature, however, is a refinement or modification, but it is valuable because the light radiating substance is thereby protected from contact with water and the destructive effects caused by friction engendered in passing thru the water.

In following the plans of the drawing for making the device for general distribution, I provide sheet metal of suitable character and punch it out to be subsequently formed into the desired configuration. I then form the punched sheet pieces into the two halves 10—10'; each half is surrounded entirely by a rib 11—11', respectively. The ribs at the front end are enlarged, as at 12, and on the underside at 13—13'.

The two halves 10—10' are placed together with the ribs in contact and with the concave sides confronting each other. The ribs are then soldered, brazed or cemented together to provide a sealed water-tight casing enclosing an interior chamber. These two halves, when put together, form an elongated body having an upwardly sloping front end and a downwardly sloping rear end.

The enlarged part 12 of adjoining ribs at the front end of the structure are transversely perforated at 14, 15 and 16. When the line 19 is secured in the perforation 14 the lure will dive into the water and remain deeply submerged as it is pulled thru the water.

When the line is secured in the orifice 15 the lure will not be so deeply submerged as it passes thru the water, and when the line is placed in the hole 16 the lure becomes a surface bait.

The holes are made thru the ribs to provide inherent integral fastening members without the necessity to employ extraneous devices for the purpose and without penetrating the casing into the enclosed chamber.

The wider parts of the ribs at 12 and 13 have their corner edges turned back at 17 to provide abutments to maintain the hooks 18 in a more or less vertical position and to prevent the hooks from encountering the body part of the lure.

Protuberances 20 are formed near the front ends of each member 10—10' in representation of eyes.

When the structure is drawn rapidly thru the water, at whatever depth, it moves from side to side, or wiggles like a fish and when the speed of the movement is varied it has an intermittent vertical movement because its forcible movement thru the water has the effect to submerge it substantially proportional to its speed. At the same time its buoyancy constantly tends to make it rise to the surface. For this reason the device has a double wiggle, one in a vertical direction and the other in a lateral direction, hence the lure becomes very attractive.

Having described my invention what I claim as new and desire to secure by Letters Patent, is:—

1. A fish lure, comprising an elongated casing having a longitudinally central rib perforated to receive hooks, parts of the rib on each side of said perforations being outturned to confine the hooks therebetween.

2. A fish lure having an elongated body part with an upwardly sloping front end and a transversely central rib extending about the body, the rib at the front end being widened and containing a plurality of line-attaching perforations.

3. A fish lure having an elongated body part with an upwardly sloping front end and a downwardly sloping rear end and a transversely central rib extending about the body, the rib at the front end being widened and containing a plurality of line-attaching perforations.

In testimony whereof I hereunto set my hand.

CLARENCE L. DEWEY.